United States Patent [19]
Girgis et al.

[11] Patent Number: 6,087,000
[45] Date of Patent: Jul. 11, 2000

[54] COATED FIBER STRANDS, COMPOSITES AND CABLES INCLUDING THE SAME AND RELATED METHODS

[75] Inventors: Mikhail M. Girgis, Wexford; Philip L. Schell, Pittsburgh, both of Pa.

[73] Assignee: PPG Industries Ohio, Inc., Cleveland, Ohio

[21] Appl. No.: 08/993,026

[22] Filed: Dec. 18, 1997

[51] Int. Cl.$^7$ ....................................... B32B 9/00
[52] U.S. Cl. .................... 428/392; 428/372; 428/375; 428/373; 428/378; 428/394
[58] Field of Search ..................... 428/372, 375, 428/373, 378, 392, 394

[56] References Cited

U.S. PATENT DOCUMENTS

| | | | |
|---|---|---|---|
| 3,803,339 | 4/1974 | Speekman | 174/23 C |
| 4,002,819 | 1/1977 | Woytiuk | 174/23 C |
| 4,137,209 | 1/1979 | Wong et al. | 260/29.6 |

(List continued on next page.)

FOREIGN PATENT DOCUMENTS

| | | |
|---|---|---|
| 0013477A1 | 7/1980 | European Pat. Off. . |
| 0107433A2 | 5/1984 | European Pat. Off. . |
| 0174424A1 | 3/1986 | European Pat. Off. . |
| 0284900A2 | 10/1988 | European Pat. Off. . |
| 0306204A1 | 3/1989 | European Pat. Off. . |
| 0528653 | 2/1993 | European Pat. Off. . |
| 3330957A1 | 3/1985 | Germany . |
| 55-158152 | 7/1981 | Japan . |
| 60-016837 | 10/1985 | Japan . |
| 2261830 | 10/1990 | Japan . |
| 1598807 | 9/1981 | United Kingdom . |
| 2164198 | 3/1986 | United Kingdom . |
| 2172410 | 9/1986 | United Kingdom . |
| WO98/06109 | 2/1998 | WIPO . |

OTHER PUBLICATIONS

Material Safety Data Sheet for Zonyl® 8300, CIBA Chemicals Division, Ciba–Geigy Corporation (Oct. 3, 1996).
Zonyl® 8300 Technical Bulletin of CIBA Specialty Chemicals (Mar. 27, 1997).
"Neptocofitech is the Solution", *Wire Technology Int'l* (May/Jun. 1996).
"CABLOC 80HS Superabsorbent Polymer", Technical Bulletin of Stockhausen, Inc. undated.
Material Safety Data Sheet for "CABLOC 80HS" Stockhausen, Inc. (Oct. 1994).
R. Klem et al. "Review of Synthetic and Starch–Graft Copolymer Superabsorbents", Grain Processing Corporation (Feb. 29, 1996).
"CABLOC® Superabsorbent Polymers for Power & Communication Cable Systems" Technical Bulletin of Stockhausen, Inc. May 1995.
"Owens–Corning technology prevents water damage to optical fibers", *Wire Journal International* (Feb. 1996) at p. 54.
"Building Better Nonwovens" Technical Bulletin of Rohm and Haas Company (1994).
"Rhoplex® Acrylic Emulsions for Bonding and Finishing Dry–Laid Nonwoven Fabrics", Technical Bulletin of Rohn and Haas Company undated.

(List continued on next page.)

*Primary Examiner*—William Krynski
*Assistant Examiner*—J. M. Gray
*Attorney, Agent, or Firm*—Ann Marie Cannoni; Andrew C. Siminerio

[57] ABSTRACT

The present invention provides fiber strands having on at least a portion of surfaces thereof (a) a primary layer of a coating composition including a hydrophobic fluorine-containing polymer, the primary coated strands being useful for reinforcing thermoplastic composites, and (b) a secondary layer including a hydrophilic material applied over at least a portion of the primary layer, the secondarily coated strands being useful for inhibiting water wicking in a telecommunications cable assembly.

21 Claims, 2 Drawing Sheets

U.S. PATENT DOCUMENTS

| | | | |
|---|---|---|---|
| 4,172,066 | 10/1979 | Zweigle et al. | 260/29.6 |
| 4,326,094 | 4/1982 | Hunn | 174/23 R |
| 4,390,647 | 6/1983 | Girgis | 523/212 |
| 4,401,366 | 8/1983 | Hope | 350/96.23 |
| 4,457,583 | 7/1984 | Mayr et al. | 350/96.23 |
| 4,511,477 | 4/1985 | McKinley et al. | 210/689 |
| 4,596,897 | 6/1986 | Gruhn | 174/36 |
| 4,605,818 | 8/1986 | Arroyo et al. | 174/107 |
| 4,655,545 | 4/1987 | Yamanishi et al. | 350/96.34 |
| 4,661,406 | 4/1987 | Gruhn et al. | 428/397 |
| 4,663,231 | 5/1987 | Girgis et al. | 428/378 |
| 4,701,345 | 10/1987 | Giatras et al. | 427/45.1 |
| 4,730,894 | 3/1988 | Arroyo | 385/113 |
| 4,742,140 | 5/1988 | Greenwood et al. | 526/245 |
| 4,746,767 | 5/1988 | Gruhn | 174/36 |
| 4,762,750 | 8/1988 | Girgis et al. | 428/378 |
| 4,762,751 | 8/1988 | Girgis et al. | 428/378 |
| 4,781,433 | 11/1988 | Arroyo et al. | 350/96.23 |
| 4,795,678 | 1/1989 | Girgis | 428/391 |
| 4,815,813 | 3/1989 | Arroyo et al. | 350/96.23 |
| 4,818,060 | 4/1989 | Arroyo | 350/96.23 |
| 4,836,640 | 6/1989 | Gartside, III et al. | 350/96.23 |
| 4,867,526 | 9/1989 | Arroyo | 350/96.23 |
| 4,874,219 | 10/1989 | Arroyo et al. | 350/96.23 |
| 4,896,940 | 1/1990 | Kathiresan et al. | 350/96.23 |
| 4,946,237 | 8/1990 | Arroyo et al. | 350/96.23 |
| 4,948,829 | 8/1990 | Mitsuji et al. | 524/457 |
| 4,954,559 | 9/1990 | Den Hartog et al. | 524/507 |
| 4,971,419 | 11/1990 | Gartside et al. | 350/96.23 |
| 5,071,221 | 12/1991 | Fujitani et al. | 385/100 |
| 5,082,719 | 1/1992 | Arroyo | 428/219 |
| 5,109,457 | 4/1992 | Panuska et al. | 385/102 |
| 5,116,682 | 5/1992 | Chakravarti et al. | 428/395 |
| 5,131,064 | 7/1992 | Arroyo et al. | 385/102 |
| 5,146,046 | 9/1992 | Arroyo et al. | 174/23 R |
| 5,182,784 | 1/1993 | Hager et al. | 385/128 |
| 5,197,202 | 3/1993 | Jensen | 34/23 |
| 5,264,251 | 11/1993 | Geursen et al. | 428/395 |
| 5,342,686 | 8/1994 | Geursen et al. | 428/378 |
| 5,368,924 | 11/1994 | Merrill, Jr. et al. | 428/241 |
| 5,373,100 | 12/1994 | Arroyo et al. | 174/23 |
| 5,389,442 | 2/1995 | Arroyo et al. | 428/396 |
| 5,573,857 | 11/1996 | Auger | 428/480 |
| 5,576,381 | 11/1996 | Bladel et al. | 524/544 |
| 5,619,606 | 4/1997 | Bonicel | 385/102 |

OTHER PUBLICATIONS

"ROVENE® 5550", Technical Bulletin of Rohn and Haas Company (Feb. 1994).

"Chemicals for the Chemical Industry", Technical Bulletin of Rohm and Haas Company (Nov. 1997).

"PN–3716–K Technical Data Sheet", Technical Bulletin of H. B. Fuller Company (Jul. 1994).

"PN–3716–L1 Technical Data Sheet", Technical Bulletin of H. B. Fuller Company (Jul. 1994).

"PN–3716–K Material Safety Data Sheet", of H. B. Fuller Company (Jul. 1994).

"PN–3716–L1 Material Safety Data Sheet", of H. B. Fuller Company (Jul. 1994).

"KEVLAR Non–Wicking Yarns" Technical Bulletin of E.I. duPont de Nemours and Company undated.

"Nordson B–60 Electrostatic Dusting System", a Technical Bulletin of Electrostatic Technology, Inc. A subsidiary of Nordson Corporation, Branford. Undated.

*Hawley's Condensed Chemical Dictionary*, (12th Edition, 1993) at p. 618, 850, 1075, 461, 435, 331, and 3.

*Kirk–Othmer Encyclopedia of Chemical Technology*, vol. 1 (1963) at p. 285, 305, 203–205, 259–297, 305–307, vol. 19 at pp. 90–95; vol. 21 at pp. 56–69.

*Encyclopedia of Polymer Science and Technology*, vol. 13 (1970) at pp. 130–139, 156–197; vol. 6 (1967) at pp. 505–712.

K. Loewenstein, *The Manufacturing Technology of Continuous Glass Fibres*, (3rd Ed. 1993) at pp. 237–289, 30–44, 47–60, 115–122, 126–135, 165–172, 219–222.

*Webster's New Collegiate Dictionary* (1977) at p. 1178.

"Water Lock® G–400 Series Superabsorbent Polymers", a Technical Bulletin of Grain Processing Corp. (Jan. 23, 1996).

"Test Procedures for Wicking and Hygroscopicity", a Technical Bulletin of Superior Cable Corporation, I. Rubin, *Handbook of Plastic Materials and Technology* (1990) at pp. 955–1062, 1179–1215 and 1225–1271.

COATED FIBER STRANDS, COMPOSITES AND CABLES INCLUDING THE SAME AND RELATED METHODS

FIELD OF THE INVENTION

This invention relates to coated fiber strands and, more particularly, to fiber strands having a hydrophobic coating for reinforcing applications such as thermoplastic composites and which further can be impregnated with a hydrophilic material for reinforcing cable assemblies in which such strands inhibit water wicking along the strand surface.

BACKGROUND OF THE INVENTION

To repel water and inhibit wicking, U.S. Pat. No. 5,116,682 discloses yarn for heat stable fabrics which is coated with a perfluorinated polymer such as a perfluoroalkyl acrylic or methacrylic copolymer. U.S. Pat. No. 4,742,140 discloses oil- and water-repellent coatings for textile fabrics including copolymers of selected fluoroalkyl acrylate monomers, vinylidene chloride and alkyl acrylates or alkyl methacrylates.

To resist flame spread and smoke evolution, U.S. Pat. Nos. 4,605,818 and 4,781,433 disclose plenum cables having heat resistant woven glass fiber tape which is impregnated with a fluorocarbon resin material such as polytetrafluoroethylene (PTFE). Similarly, U.S. Pat. No. 4,818,060 discloses a flame and smoke resistant optical fiber cable having a woven glass fiber tape which is impregnated with mica, silicone and a fluoropolymer material such as PTFE.

U.S. Pat. Nos. 4,326,094, 4,815,813, 4,867,526, 5,082,719, 5,131,064 and 5,146,046 disclose communications cables which include a water blockable yarn, strip or tape extending along the cable which is treated with a superabsorbent material which swells upon contact with water and inhibits movement of water within the cable. U.S. Pat. No. 5,373,100 discloses a communications cable including such a water blockable tape or yarn and a hydrophobic water repelling material, such as a styrene-ethylene-butylene-styrene block copolymer, filling voids or interstices remaining in the core.

In optical fiber cable reinforcement applications, water entering the cable assembly can corrode and/or crush the optical fibers by expansion due to freezing temperatures. It is desirable to provide a telecommunications cable assembly in which the reinforcing fibers are coated to inhibit water penetration and migration throughout the cable assembly and withstand the rigorous environment to which such reinforcements are subjected. Coated strands which resist hydrolysis in thermoplastic composites are also desirable.

SUMMARY OF THE INVENTION

The present invention provides a strand comprising a plurality of fibers having on at least a portion of surfaces thereof: (a) a primary layer of a coating composition comprising a hydrophobic fluorine-containing polymer; and (b) a secondary layer comprising a hydrophilic material applied over at least a portion of the primary layer.

Another aspect of the present invention is a glass fiber strand having on at least a portion of surfaces thereof: (a) a primary layer of a coating composition comprising a hydrophobic fluorine-containing polymer; and (b) a secondary layer comprising a hydrophilic material applied over at least a portion of the primary layer.

Yet another aspect of the present invention is an telecommunications cable assembly comprising: (a) a transmission conductor; and (b) a reinforcement strand positioned about at least a portion of a periphery of the transmission conductor for reinforcing the transmission conductor, the reinforcement strand comprising a plurality of fibers having on at least a potion of surfaces thereof: (i) a primary layer of a coating composition comprising a hydrophobic fluorine-containing polymer; and (ii) a secondary layer comprising a hydrophilic material applied over at least a portion of the primary layer.

Another aspect of the present invention is a reinforced polymeric composite comprising: (a) a reinforcement strand comprising a plurality of fibers having on at least a portion of surfaces thereof a primary layer of a coating composition comprising a hydrophobic fluorine-containing polymer which is the polymerization reaction product of a fluoroalkyl acrylate monomer component, vinylidene chloride and an alkyl acrylate monomer component; and (b) a thermoplastic polymeric matrix material.

Yet another aspect of the present invention is a method of reducing the wicking of water along a surface of a fiber strand comprising a plurality of fibers, comprising: (a) applying a primary layer of a coating composition comprising a hydrophobic fluorine-containing polymer to at least a portion of a plurality of fibers; and (b) applying a secondary layer comprising a hydrophilic material over at least a portion of the primary layer; and (c) at least partially drying the strand of (b), such that the surface of the strand wicks water at a rate of less than about 25.4 millimeters (one inch) in about six hours at a temperature of about 25° C.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE PREFERRED EMBODIMENTS

The coated fiber strands of the present invention provide reinforcements for a wide variety of applications. In a preferred embodiment, the coated fiber strands inhibit water penetration and migration throughout a telecommunications cable assembly. In another preferred embodiment, coated fiber strands of the present invention inhibit hydrolysis in thermoplastic composites.

Figure 1:
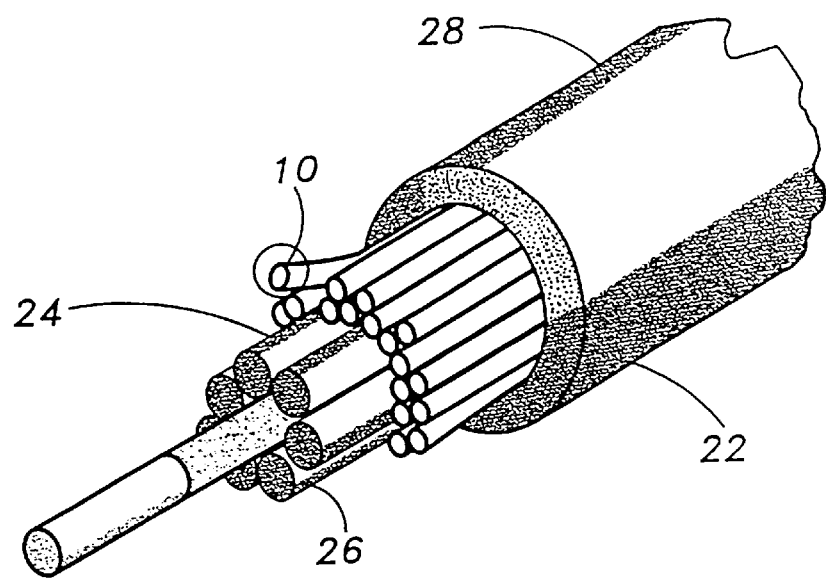
FIG. 1 is a perspective view of a portion of an optical fiber cable assembly including coated strands according to the present invention.
Figure 2:
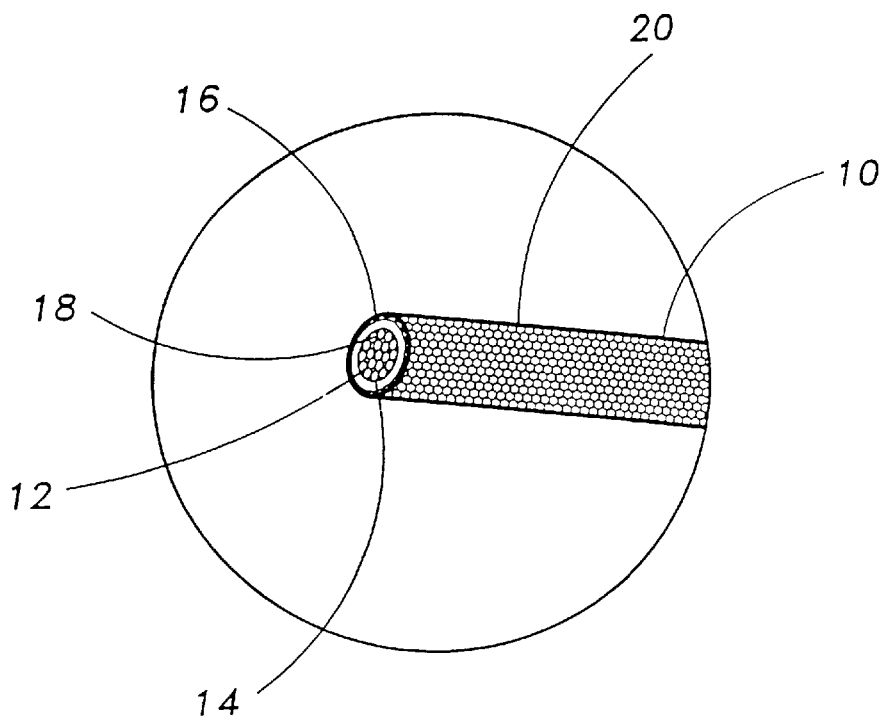
FIG. 2 is an enlarged view of a portion of the coated strands of FIG. 1.

Referring to the drawings, wherein like numerals indicate like elements throughout, there is shown FIGS. 1 and 2 a preferred embodiment of a strand 10 according to the present invention. The strand 10 comprises a plurality of fibers 12 having on at least a portion of surfaces 14 thereof, and preferably the entire surfaces 14 of the fibers 12, a primary layer 16 of a coating composition comprising one or more hydrophobic fluorine-containing polymers. This primary layer 16 can be present directly upon the fibers as a sizing composition or as a secondary coating applied over at least a portion of a sizing composition, as will be discussed in detail below. Such coated fibers are useful for thermoplastic composite reinforcement and for reinforcing telecommunications cables, for example. In an alternative embodiment useful for reinforcing telecommunications cables, the fiber strands coated with the fluorine-containing polymer can have an outer coating of a hydrophilic material, which will be discussed in detail below.

Referring now to FIG. 2, the primary layer 16 of a coating composition comprising one or more hydrophobic fluorine-containing polymers will now be discussed. Suitable hydrophobic fluorine-containing polymers contain at least one fluorine atom. As used herein, "hydrophobic" means that the fluorine-containing polymer is not compatible with, does not have an affinity for and/or is not capable of dissolving in water, i.e., it repels water. See Hawley's Condensed Chemical Dictionary, (12th Ed. 1993) at page 618. Also, the fluorine-containing polymer preferably repels, is not compatible with, does not have an affinity for and/or is not capable of dissolving in oils, such as petroleum and petroleum-derived mineral oils, vegetable or animal oils, or solid predominately hydrocarbon unctuous materials, such as waxes, fats or gelled oils. See Hawley's Condensed Chemical Dictionary, (12th Ed. 1993) at page 850, which is hereby incorporated by reference.

Non-limiting examples of suitable hydrophobic fluorine-containing polymers include polytetrafluoroethylene (PTFE), tetrafluoroethylene-hexafluoropropylene copolymers, ethylene-tetrafluoroethylene copolymers (ETFE), perfluoroalkoxyethylene-tetrafluoroethylene copolymers (PFA), chlorotrifluoroethylene copolymers, vinyl fluoride polymers, vinylidene fluoride polymers, copolymers of vinylidene fluoride and chlorotrifluoroethylene (such as Kel-F elastomers which are commercially available from Minnesota Mining and Manufacturing Co. (3M) of Minnesota) and copolymers of perfluoropropylene and vinylidene fluoride (such as VITON copolymers which are commercially available from E. I. duPont de Nemours & Co., Inc. of Wilmington, Del. and FLUOREL copolymers from 3M). Perfluoroacrylic copolymers are preferred for use as fluorine-containing polymers in the present invention.

Useful fluorine-containing polymers are the ZONYL® fluoropolymers which are commercially available from Ciba-Geigy Corporation of Greensboro, N.C. A preferred fluorine-containing polymer is ZONYL® 8300[1], which is a nonionic dispersion of about 14 to about 20 weight percent perfluoroacrylic copolymer, about 1 to about 5 weight percent of an ethoxylated aliphatic alcohol, about 4 weight percent hexylene glycol and about 70 to about 85 weight percent water, according to a Material Safety Data Sheet for ZONYL® 8300 (Oct. 3, 1996), which is hereby incorporated by reference. According to the manufacturer's representative, the perfluoroacrylic copolymer used in ZONYL® 8300 is similar to those disclosed in U.S. Pat. No. 4,742,140, which is hereby incorporated by reference.

[1]ZONYL® 8300 fluoroacrylic polymer is commercially available from Ciba-Geigy Corporation of Greensboro, N.C.

U.S. Pat. No. 4,742,140 discloses oil and water repellent fluorine-containing polymers suitable for use in the present invention which are polymerization reaction products of one or more fluoroalkyl acrylate monomers, vinylidene chloride, and one or more alkyl acrylates or alkyl methacrylates.

Non-limiting examples of suitable fluoroalkyl acrylate monomers disclosed in U.S. Pat. No. 4,742,140 include perfluoroalkylethylacrylate mixtures comprising perfluoroalkylethylacrylates of the formula (I):

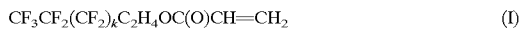

$$CF_3CF_2(CF_2)_kC_2H_4OC(O)CH=CH_2 \quad (I)$$

where such mixtures consist essentially of 0–10 weight percent monomer where k is an even integer which is 4 or less; 45–75 weight percent monomer wherein k is 6; 20–40 weight percent monomer wherein k is 8; 1–20 weight percent monomer wherein k is 10; and 0–5 weight percent monomer wherein k is 12. Preferably, the perfluoroalkyl-ethylacrylate mixture, as disclosed in U.S. Pat. No. 4,742, 140, consists essentially of 0–8 weight percent monomer where k is an even integer which is 4 or less; 45–65 weight percent monomer wherein k is 6; 25–35 weight percent monomer wherein k is 8; 5–15 weight percent monomer wherein k is 10; and 0–5 weight percent monomer wherein k is 12.

According to U.S. Pat. No. 4,742,140, the vinylidene chloride content can range from about 10 to about 35 weight percent of the fluoropolymer composition. Vinyl chlorides are also suitable for forming the fluoropolymers suitable for use in the present invention.

Suitable alkyl acrylate or alkyl methacrylate monomers disclosed in U.S. Pat. No. 4,742,140 have linear, cyclic or branched-chain alkyl groups having chain lengths of 2 to 18 carbon atoms. Non-limiting examples of such monomers include ethyl acrylate, propyl acrylate, butyl acrylate, cyclohexyl acrylate, isoamyl acrylate, isodecyl acrylate, isodecyl methacrylate, 2-ethylhexyl methacrylate, octyl acrylate, lauryl acrylate, cetyl acrylate, stearyl acrylate and stearyl methacrylate.

Minor amounts of other monomers (about 0.1 to 5 weight percent) can be included to improve cross-linking, latex stability and substantively of the fluoropolymer, such as for example chlorohydroxypropyl methacrylate, chlorohydroxypropyl acrylate, poly(oxyethylene) acrylates or methacrylates, N-methylol acrylamide, N-methylol methacrylamide, hydroxyethyl acrylate or hydroxyethyl methacylate.

Such fluorine-containing polymers can be produced by conventional emulsion polymerization techniques such as are disclosed in U.S. Pat. No. 4,742,140 at col. 3, line 42-col. 4, line 12.

The fluorine-containing polymer can be present as a solid, but preferably is present in an aqueous dispersion with one or more surfactants, such as a cationic or nonionic emulsifying agent. Non-limiting examples of suitable emulsifying agents include cationic emulsifying agents such as dodecyltrimethylammonium acetate, trimethyltetradecylammonium chloride, hexadecyltrimethylammonium bromide, trimethyloctadecylammonium chloride and nonionic emulsifying agents such as condensation products of ethylene oxide with 12–18 carbon atom fatty alcohols, 12–18 carbon atom fatty acids, alkylphenols having 12–18 carbon atoms in the alkyl group, 12–18 carbon atom alkanethiols and 12–18 carbon atom alkyl amines.

Based upon the weight of the total solids of the coating composition, the fluorine-containing polymer generally comprises about 2 to 100 weight percent of the coating composition, preferably comprises about 10 to about 30 weight percent, and more preferably comprises about 15 to about 20 weight percent of the coating composition.

The coating composition of the primary layer 16 can further comprise one or more thermoplastic film-forming materials or thermosetting film forming materials chemically different from the fluorine-containing polymer discussed above, for example the thermoplastic film-forming material can be chemically different if it does not contain any fluorine atoms. Examples of suitable thermoplastic film-forming materials include acrylic polymers, polyolefins, thermoplastic polyesters, thermoplastic vinyl polymers and mixtures thereof.

Preferably, the coating composition includes one or more water soluble, emulsifiable or dispersible acrylic polymers prepared by vinyl addition polymerization of a first monomer component comprising a first vinyl aromatic monomer(s) and an acrylic monomer(s). As used herein, "water soluble" means that the polymer is capable of being essentially uniformly blended and/or molecularly or ionically dispersed in water to form a true solution. See *Hawley's Condensed Chemical Dictionary*, (12th Ed. 1993) at page 1075, which is hereby incorporated by reference. The term "emulsifiable" as used herein means that the polymer is capable of forming an essentially stable mixture or being suspended in water in the presence of an emulsifying agent. See Hawley's at page 461, which is hereby incorporated by reference. Non-limiting examples of suitable emulsifying agents are set forth below. The term "dispersible" means that the polymer is capable of being distributed throughout water as finely divided particles, such as a latex. See Hawley's at page 435, which is hereby incorporated by reference. The uniformity of the dispersion can be increased by the addition of wetting, dispersing or emulsifying agents (surfactants), which are discussed below. As used herein, the term "curable" means (1) the polymer is capable of being at least partially dried by air and/or heat; and/or (2) the polymer, other components of the composition and/or glass fibers are capable of being crosslinked to each other to change the physical properties of the polymer. See Hawley's at page 331, which is hereby incorporated by reference.

Non-limiting examples of suitable first vinyl aromatic monomers for forming the acrylic polymer include vinylbenzene, divinylbenzene, vinyl toluene, alpha methyl styrene, halostyrenes such as chlorostyrene, and mixtures thereof. Suitable acrylic monomer(s) (hereinafter "acrylic(s)") for forming the acrylic polymer can include acrylic acid, methacrylic acid, esters of acrylic acid and methacrylic acid, such as acrylates and methacrylates, including epoxy functional (meth)acrylates, acrylic anhydrides, acrylamides, acrylonitriles and derivatives and mixtures thereof. See Kirk-Othmer *Encyclopedia of Chemical Technology*, Vol. 1 (1963) at page 285, which is hereby incorporated by reference. Useful acrylics can have hydroxy and/or epoxy functionality.

Useful esters of acrylic or methacrylic acid include straight chain or branched alkyl or hydroxyalkyl esters of acrylic or methacrylic acid. Useful alkyl esters can contain about 1 to about 24 carbon atoms, and preferably containing about 1 to about 18 carbon atoms. Non-limiting examples of such alkyl esters include methyl (meth)acrylate, ethyl (meth) acrylates and propyl (meth)acrylates.

Non-limiting examples of other useful acrylics include glycol acrylates and polyol acrylates. Useful epoxy functional acrylates include polyglycidyl acrylates and polyglycidyl methacrylates. Non-limiting examples of suitable acrylamides include methacrylamide, methylolacrylamide, and N-substituted derivatives thereof. Non-limiting examples of suitable acrylonitriles include acrylonitrile and methacrylonitrile.

The first vinyl aromatic monomer and/or acrylic monomer can be addition polymerized with other addition polymerizable monomers or polymers such as dienes, vinyl halides such as vinyl chloride and vinylidene chloride, vinyl acetates, block and graft copolymers thereof. Other useful addition polymerizable monomers include amides, such as n-methylol (meth)acrylamide; nitriles; pyrrolidones and olefins such as ethylene. Mixtures of any of the above addition polymerizable monomers are also useful. Preformed polymers of these monomers can also be addition polymerized with the first vinyl aromatic monomer and/or first acrylic monomer provided the preformed polymer has addition polymerizable unsaturation.

Methods for polymerizing acrylics with themselves and/or other addition polymerizable monomers and preformed polymers are well known to those skilled in the art of polymers and further discussion thereof is not believed to be necessary in view of the present disclosure. For example, polymerization of the acrylic can be carried out in bulk, in aqueous or organic solvent solution such as benzene or n-hexane, in emulsion, or in aqueous dispersion. Kirk-Othmer, Vol.1 at page 305. The polymerization can be effected by means of a suitable initiator system, including free radical initiators such as benzoyl peroxide or azobisisobutyronitrile, anionic initiation, and organometallic initiation. Molecular weight can be controlled by choice of solvent or polymerization medium, concentration of initiator or monomer, temperature, and the use of chain transfer agents. If additional information is needed, such polymerization methods are disclosed in Kirk-Othmer, Vol. 1 at pages 203–205, 259–297 and 305–307, which are hereby incorporated by reference.

The number average molecular weight (Mn) of the acrylic polymer, determined by gel permeation chromatography (GPC), can be about 5000 to about 200,000. The glass transition temperature of the acrylic polymer can be about $-40°$ C. to about $100°$ C. as measured using a Differential Scanning Calorimeter (DSC), for example a Perkin Elmer Series 7 Differential Scanning Calorimeter, using a temperature range of about $-55°$ C. to about $150°$ C. and a scanning rate of about $20°$ C. per minute.

Useful acrylic latexes can be characterized by the temperature at which the torsional modulus of an air dried film is 300 kg/cm$^2$, referred to as T300, which is a relative measure of stiffness. A T300 of about $+22°$ C. is considered soft while higher numbers indicate more stiff and/or tacky acrylics. The acrylics which can be used in the practice of this invention preferably have a T300 of about $-50°$ C. to about $+40°$ C.

Preferably, the acrylic polymer is present in an emulsion including an emulsifying agent, suitable examples of which are discussed below. The acrylic polymer is preferably self-crosslinking, although external crosslinking agents can be included in the coating composition for crosslinking the acrylic polymer with itself, the fluorine-containing polymer or other components of the coating composition, as discussed below. The acrylic polymer can be cationic, anionic or nonionic, but preferably is anionic or nonionic.

Non-limiting examples of suitable commercially available acrylic polymers include FULATEX® PN-3716K; FULATEX® PN-3716G styrene-acrylic copolymer, which is believed to include about 42 weight percent butyl acrylate and about 58 weight percent styrene; and FULATEX® PN-3716L1 styrene-acrylic copolymer which is believed to include about 45 weight percent butyl acrylate, 53 weight percent styrene and less than about 1 weight percent butyl methyl acrylate. See PN-3716-K and PN-3716-L1 Technical Data Sheets of H. B. Fuller Co. (Jul. 25, 1994), which are hereby incorporated by reference.

Self-crosslinking styrene-acrylic copolymer emulsions useful in the present invention include RHOPLEX® GL-618. See "Building Better Nonwovens", a Technical Bulletin of Rohm and Haas Specialty Industrial Polymers, (1994), which is hereby incorporated by reference. Other useful crosslinkable acrylic-based copolymer emulsions include RHOPLEX® NW-1845 and RHOPLEX® NW-1715 (an anionic emulsion having a glass transition temperature of about $-6°$ C. and about 44 percent solids).

Other examples of useful acrylic polymers include acrylontrile-butadiene-styrene terpolymers (ABS) and styrene-acrylonitrile copolymers (SAN).

Other types of acrylic polymer(s) can be included in the coating composition, such as homopolymers, copolymers or multipolymers of one or more monomers including acrylic acid, methacrylic acid, esters of acrylic acid and methacrylic acid (acrylates and methacrylates), acrylamides, acrylonitriles and derivatives and mixtures thereof. Addition polymerizable monomers or polymers such as vinyl monomers, dienes, vinyl acetates, amides, nitrites, pyrrolidones and olefins can be polymerized with the acrylic polymer. Useful self-crosslinking acrylic emulsions include RHOPLEX® E-32, E-693, HA-8, HA-12, HA-16, TR-407 and WL-81 emulsions commercially available from the Rohm & Haas Company; CARBOSET acrylic polymers which are commercially available from B.F. Goodrich Co. of Toledo, Ohio; copolymers of acrylic monomers with vinyl compounds such as n-methylolacrylamide vinyl acetate copolymers and VINOL® vinyl acetate products which are commercially available from Air Products and Chemicals, Inc. of Allentown, Pa.; and ethylene acrylic acid copolymers such as MICHEM® PRIME 4990 or MICHEM® PRIME 4983HS, which are commercially available from Michelman Inc. of Cincinnati, Ohio.

The amount of acrylic polymer is generally about 5 to about 99 weight percent of the coating composition on a total solids basis, preferably about 50 to about 95 weight percent, and more preferably about 70 to about 90 weight percent.

The coating composition preferably also includes an vinyl aromatic-based polymer prepared by vinyl addition polymerization of a second monomer component comprising a polymer of a vinyl aromatic monomer which is different from the acrylic polymer discussed above. For example, the vinyl aromatic-based polymer can be polymerized from a different vinyl aromatic monomer or a different addition polymerizable monomer than the acrylic polymer discussed above.

The vinyl aromatic-based polymer can be a homopolymer, copolymer or multipolymer and can be an addition polymerization product of a monomer component comprising a vinyl aromatic monomer, polymer and/or derivatives thereof (hereinafter "vinyl aromatic(s)"). The vinyl aromatic of the vinyl aromatic-based polymer can be addition polymerized with another addition polymerizable monomer or polymer, as discussed below. Non-limiting examples of suitable vinyl aromatic monomers include vinylbenzene, divinylbenzene, vinyl toluene, alpha methyl styrene, halostyrenes such as chlorostyrene, and mixtures thereof. Non-limiting examples of addition polymerizable monomers or polymers include ethylenically unsaturated monomers including vinyl monomers and polymers such as are discussed above, and also include acrylics such as are discussed above.

Methods for polymerizing vinyl aromatic monomers with themselves and/or other addition polymerizable monomers and preformed polymers are well known to those skilled in the art of polymers and further discussion thereof is not believed to be necessary in view of the present disclosure. See Encyclopedia of Polymer Science and Technology, Vol. 13 (1970) at pages 130–134; 156–197 and Kirk-Othmer, Vol. 19 at pages 90–95, all of which are hereby incorporated by reference.

Preferably, the vinyl aromatic-based polymer is present in an emulsion including an emulsifying agent, suitable examples of which are discussed below. The vinyl aromatic-based polymer is preferably self-crosslinking, although external crosslinking agents can be included in the coating composition for crosslinking the vinyl aromatic-based polymer with itself, the first acrylic polymer or other components of the coating composition, as discussed below. The vinyl aromatic-based polymer can be cationic, anionic or nonionic, but preferably is anionic.

Non-limiting examples of commercially available polymers which can be used as the vinyl aromatic-based polymer include the ROVENE® family of self-crosslinking and crosslinkable styrene-butadiene emulsions which are commercially available from Rohm and Haas Company of Philadelphia, Pa. such as ROVENE® 5550 self-crosslinking anionic carboxylated styrene butadiene emulsion having about 45 weight percent styrene and 55 percent butadiene, ROVENE® 4170 self-crosslinking styrene butadiene emulsion having about 65 percent styrene and 35 percent butadiene, ROVENE® 4402 anionic emulsion having about 50 percent styrene and 50 percent butadiene and ROVENE® 4106 anionic emulsion having about 90 percent styrene and 10 percent butadiene. See "Building Better Nonwovens" at page 7 and ROVENE® 5550", a Technical Bulletin of Rohm and Haas Company Specialty Polymers (February 1994), which is hereby incorporated by reference.

Thermoplastic elastomeric materials useful as vinyl aromatic-based polymers in the present invention also include styrene-acrylontrile (SAN) copolymers, styrene-butadiene-styrene (SBS) copolymers and acrylonitrile-butadiene-styrene (ABS) copolymers.

The amount of vinyl aromatic-based polymer is typically greater than 0.5 and preferably about 1 to about 20 weight percent of the coating composition on a total solids basis.

Preferably, the coating composition includes ZONYL® 8300 as the fluorine-containing polymer, RHOPLEX® NW-1715 as the acrylic polymer, ROVENE® 5550, FULATEX® PN-3716-L1 or FULATEX® PN-3716-G as the vinyl aromatic-based polymer and PETROLITE 75 microcrystalline wax (discussed below).

The coating composition is preferably essentially free of a urethane-containing polymer, which can increase the cost of the coated strand. The phrase "essentially free of a urethane-containing polymer" as used herein means that the coating composition contains less than about 5 weight percent of a urethane-containing polymer on a total solids basis, preferably less than about one weight percent, and most preferably the coating composition is free of a urethane-containing polymer.

The phrase "urethane-containing polymer" as used herein means any polymer containing one or more units of the structure (I):

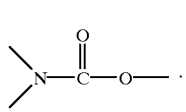

(I)

See Kirk-Othmer, Vol. 21 at pages 56–69, which are hereby incorporated by reference. As noted in Kirk-Othmer, Vol. 21 at page 57, the terms urethane and polyurethane are commonly used to refer to urethan and polyurethan, respectively. As used herein, the terms "urethane" and "polyurethane" are used to refer to "urethan" and "polyurethan", respectively. Such urethane-containing materials can be elastomeric, thermoplastic or thermosetting.

Urethane-containing polymers are typically condensation products of a polyisocyanate material and a hydroxyl-containing material such as polyether polyol or polyester polyol and include, for example, WITCOBOND® W-290H thermoplastic polyurethane which is commercially available from Witco Chemical Corp. of Chicago, Ill. and RUCO-THANE® 2011L polyurethane latex which is commercially available from Ruco Polymer Corp. of Hicksville, N.Y. Examples of thermosetting polyurethanes include BAY-BOND XW-110, which is commercially available from Bayer.

As discussed above, other suitable thermoplastic film-forming materials for use in the coating composition include polyolefins, such as polypropylene and polyethylene materials. Thermoplastic polyesters useful in the present invention include ethylene adipates and ethylene butylene adipates. Useful thermoplastic vinyl polymers include vinyl acetate copolymers and polyvinyl pyrrolidones.

The amount of thermoplastic film-forming material is generally about 30 to about 90 weight percent of the coating composition on a total solids basis, preferably about 40 to about 80 weight percent, and more preferably about 50 to about 70 weight percent.

The coating composition of the primary layer 16 can include one or more fiber lubricants, such as cationic, non-ionic or anionic lubricants and mixtures thereof. Non-limiting examples of such lubricants are glass fiber lubricants which include amine salts of fatty acids, alkyl imidazoline derivatives such as CATION X which is commercially available from Rhone Poulenc of Princeton, N.J., acid solubilized fatty acid amides, acid solubilized polyunsaturated fatty acid amides, condensates of a fatty acid and polyethylene imine and amide substituted polyethylene imines, such as EMERY® 6717, a partially amidated polyethylene imine commercially available from Henkel Corporation of Kankakee, Ill. Generally, the amount of lubricant can range from about 1 to about 15 weight percent of the coating composition on a total solids basis.

The coating composition of the primary layer 16 also can include emulsifying agents for emulsifying the thermoplastic film-forming material. Non-limiting examples of suitable emulsifying agents or surfactants include polyoxyalkylene block copolymers such as PLURONIC™ F-108 polyoxypropylene-polyoxyethylene copolymer which is commercially available from BASF Corporation of Parsippany, N.J.; ethoxylated alkyl phenols such as IGEPAL CA-630 ethoxylated octylphenoxyethanol which is commercially available from GAF Corporation of Wayne, N.J.; polyoxyethylene octylphenyl glycol ethers; ethylene oxide derivatives of sorbitol esters and polyoxyethylated vegetable oils. Generally, the amount of emulsifying agent can range from about 0.5 to about 10 weight percent of the coating composition on a total solids basis.

The coating composition of the primary layer 16 can include one or more aqueous soluble, emulsifiable or dispersible wax materials which can be selected from vegetable, animal, mineral, synthetic or petroleum waxes, for example. Preferably, the wax has a high degree of crystallinity and is obtained from a paraffinic source, such as a microcrystalline wax. The microcrystalline wax can be oxidized. Suitable waxes include MICHEM® LUBE 296 microcrystalline wax available from Michelman Inc. of Cincinnati, Ohio; POLYMEKON® SPP-W microcrystalline wax; and PETROLITE 37 and PETROLITE 75 microcrystalline waxes which are available from Petrolite Corporation of Tulsa, Okla. Generally, the amount of wax can range from about 1 to about 10 weight percent of the secondary aqueous coating composition on a total solids basis.

The coating composition can also include one or more aqueous dispersible or soluble plasticizers, such as phthalates, trimellitates and adipates. The amount of plasticizer generally can range from about 5 to about 15 weight percent of the coating composition on a total solids basis.

Other additives such as flame retardants (including antimony trioxides and halogenated phosphates), antioxidants and antistatic agents can also be included in the coating composition. The amount of additive can range from about 1 to about 3 weight percent of the coating composition on a total solids basis.

A dye can be included in the coating composition to provide a colored strand product to assist in product identification. Non-limiting examples of useful colorants or pigments include carbon black, nigrosine, and cadmium-based compounds, iron oxide-based compounds and chromium compounds. Generally, the amount of dye on an aqueous basis can range from about 1 to about 5 weight percent.

Water (preferably deionized) is included in the coating composition in an amount sufficient to facilitate application of a generally uniform coating upon the fibers of the strand. Generally, the weight percentage of solids of the coating composition can range from about 2 to about 50 weight percent. Preferably, the weight percentage of solids is about 20 to about 35 weight percent and, more preferably, about 25 to about 35 weight percent. Although not preferred, it should be understood that minor amounts of water miscible or water soluble organic solvents can be included in the coating composition of the primary layer 16, so long as the essential characteristics of the coating composition are not adversely affected.

The coating composition of the present invention can be prepared by any suitable method well known to those of skilled in the art. The fluorine-containing polymer and other film-forming materials (if present) can be mixed and/or reacted with any other components of the coating composition, such as emulsifiers, dye, wax and/or water. Preferably each of the components is diluted with water prior to addition to the mixture. If necessary, the plasticizer or lubricant can be pre-emulsified prior to addition to the mixture. The components of the composition are then mixed to form a generally homogenous mixture prior to application to the strand.

The coating composition of the primary layer 16 can be present upon surfaces 14 of the fibers 12 as a sizing or as a secondary coating applied over a sizing composition. As used herein, the terms "size", "sized" or "sizing" refer to the aqueous composition applied to the fibers immediately after formation of the fibers which is preferably dried. The term "secondary coating" refers to a coating composition applied secondarily to one or a plurality of strand(s) after the sizing composition is applied, and preferably at least partially dried.

Preferably the coating composition of the primary layer 16 is applied as a secondary coating over the dried residue of a sizing composition which is different from the coating composition of the primary layer 16 discussed above, having either different amount(s) of similar components or one or more chemically different components. Suitable components for the sizing composition will now be discussed. Preferably the sizing composition is aqueous-based and can include film-forming materials such as thermosetting and thermoplastic film-forming materials; lubricants; coupling agents such as organo silane coupling agents; waxes; emulsifiers and water such as are discussed above. Non-limiting examples of suitable sizing compositions are disclosed in K. Loewenstein, *The Manufacturing Technology of Continuous Glass Fibres*, (3d Ed. 1993) at pages 237–289 and U.S. Pat. Nos. 4,390,647 and 4,795,678, each of which is hereby incorporated by reference.

A preferred sizing composition includes about 78 weight percent PLURACOL V-10 polyoxyalkylene polyol (commercially available from BASF Wyandotte of Michigan); about 8 weight percent EMERY 6717 partially amidated polyethylene imine lubricant (commercially available from Henkel Corporation of Kankakee, Ill.) and about 14 weight percent A-1108 aminosilane (commercially available from OSi Specialties, inc. of Danbury Conn.).

The primary layer 16 of the coating composition (present as a sizing composition or secondary coating) is applied to fibers, strands, yarns or the like of natural or man-made materials. Fibers believed to be useful in the present invention and methods for preparing and processing such fibers are discussed at length in the *Encyclopedia of Polymer Science and Technology*, Vol. 6 (1967) at pages 505–712, which is hereby incorporated by reference.

Suitable natural fibers include those derived directly from animals and vegetables, such as cotton, cellulose, natural rubber, flax, ramie, hemp, sisal and wool. Suitable natural inorganic fibers derived from mineral sources include glass and polycrystalline fibers, such as ceramics including silicon carbide, and carbon or graphite.

The preferred fibers for use in the present invention are glass fibers, a class of fibers generally accepted to be based upon oxide compositions such as silicates selectively modified with other oxide and non-oxide compositions. Useful glass fibers can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Preferred glass fibers are formed from E-glass. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, "The Manufacturing Technology of Glass Fibres", (3d Ed. 1993) at pages 30–44, 47–60, 115–122 and 126–135, which are hereby incorporated by reference.

Suitable man-made fibers can be formed from a fibrous or fiberizable material prepared from natural organic polymers, synthetic organic polymers or inorganic substances. As used herein, the term "fiberizable" means a material capable of being formed into a generally continuous filament, fiber, strand or yarn. Suitable man-made fibers include polyamides, polyesters, acrylics, polyolefins, polyurethanes, vinyl polymers, polyimides, polyether sulfones, polyphenyl sulfones, polyetherketones, polyphenylene oxides, polyphenylene sulfides, polyacetals, synthetic rubbers or spandex polyurethanes. It is understood that blends or copolymers of any of the above materials and combinations of fibers formed from any of the above materials can be used in the present invention, if desired.

The present invention will now be discussed generally in the context of glass fiber strands. However, one of ordinary skill in the art would understand that the coating compositions of the present invention are useful for coating any of the fibers discussed above.

Suitable apparatus and methods for processing glass fiber strands will be discussed below. For further information, see Loewenstein (3d Ed.) at pages 165–172 and 219–222, which are hereby incorporated by reference.

The primary layer 16 of coating composition can be applied in many ways, for example by contacting the filaments with a static or dynamic applicator, such as a roller or belt applicator, spraying, dipping or other means. The fibers are preferably dried at room temperature or in a dryer at elevated temperatures to remove excess moisture from the fibers and, if present, cure any curable sizing or secondary coating composition components. The temperature and time for drying the glass fibers will depend upon such variables as the percentage of solids in the sizing composition, components of the sizing composition and type of glass fiber. The sizing composition is typically present on the fibers in an amount between about 0.1 percent and about 5 percent by weight after drying.

In the preferred embodiment, the fibers are gathered into strands and the primary layer 16 of the coating composition is applied as a secondary coating over a sublayer 18 of sizing composition in an amount effective to coat or impregnate the fibers of the strands. The secondary coating can be conventionally applied by dipping the strand in a bath containing the composition, by spraying the secondary coating upon the strand or by contacting the strand with a static or dynamic applicator such as a roller or belt applicator, for example. The coated strand can be passed through a die to remove excess coating composition from the strand and/or dried as discussed above for a time sufficient to at least partially dry or cure the secondary coating. The method and apparatus for applying the secondary coating to the strand is determined in part by the configuration of the strand material.

Preferably, the secondary coating is applied to the strands by passing the strands through a bath or dip of the secondary coating and exposing the fibers to elevated temperatures for a time sufficient to at least partially dry or cure the secondary coating. The strand can be "opened up" just before entering the secondary coating bath by passing it over a bar or other spreading device which acts to separate the individual fibers from one another. This spreading of the fibers from one another results in a more thorough impregnation of the strand with the composition. Preferably, a die is used to remove the excess coating.

The amount of the secondary coating composition on the strand is defined as the dip pick-up (DPU). The DPU is calculated using the weight of the glass strand before and after the secondary coating composition is applied. The DPU is defined as the coated strand weight minus the uncoated strand weight, divided by the uncoated strand weight. Multiplying the resultant figure by 100 results in percent DPU. The DPU of the impregnated bundles or strands of the instant invention is about 1 to about 20 weight percent for a single pass through the impregnant bath and drying step. The strands may ultimately have an amount of coating greater than about 30 weight percent by passing them through the impregnating bath a number of times or by overcoating the coated bundle of fibers or strands with the secondary coating composition. Preferably, the strand having the dried residue of the secondary aqueous coating composition thereon typically has a dip pick-up (DPU) of between about 1 to about 30 weight percent, and preferably about 8 to about 15 weight percent.

The strand is preferably dried after application of the secondary aqueous coating composition in a manner well known in the art. The impregnated strand is at least partially dried in air at room temperature (about 25° C.) or alternatively in a furnace or oven preferably above 232° C. (450° F.) to speed the curing process and evaporate the water. A particularly suitable dryer is that disclosed in U.S. Pat. No. 5,197,202, which is hereby incorporated by reference.

After the sizing and secondary coating composition (if present) have been applied to the glass strand and each layer has been dried, additional coatings can be applied over at least a portion of the primary layer 16. In a preferred embodiment for reinforcing telecommunications cables, a secondary or outer layer 20 comprising one or more hydrophilic materials is applied over at least a portion of the primary layer.

The hydrophilic materials of the secondary layer 20 can absorb or swell when in contact with water or participate in a chemical reaction with the water to form, for example, a viscous gel-like solution which blocks or inhibits further ingress of water into the interstices of the telecommunications cable 10. As used herein, "absorb" means that the water penetrates the inner structure or interstices of the hydrophilic material and is substantially retained is therein. See *Hawley's Condensed Chemical Dictionary* at page 3, which is hereby incorporated by reference. "Swell" means that the hydrophilic material expands in size or volume. See Webster's New Collegiate Dictionary (1977) at page 1178, which is hereby incorporated by reference. Preferably, the hydrophilic material swells after contact with water to at least one and one-half times its original weight, and more preferably about two to about six times its original weight.

Suitable hydrophilic materials include "superabsorbents", which are hydrophilic materials which can absorb and retain under pressure many times their own weight of aqueous fluids such as water. See R. Klem et al., "Review of Synthetic and Starch-Graft Copolymer Superabsorbents" a publication of Grain Processing Corporation (1983), which is hereby incorporated by reference. As discussed therein at page 1, properties used to characterize superabsorbents include enzyme stability, biodegradability, absorbent capacity and rate of uptake.

Useful superabsorbents include starch-graft copolymers, modified gums and cellulosics, and synthetic superabsorbents. Suitable starch-graft copolymers include saponified starch-graft polyacrylonitrile copolymers. Synthetic superabsorbents useful for the secondary coating of the present invention include nonelectrolytes and polyelectrolytes such as polyacrylic acid superabsorbents, polymaleic anhydride-vinyl monomer superabsorbents, polyacrylonitrile-based superabsorbents and polyvinyl alcohol superabsorbents.

Suitable polyacrylic acid superabsorbents include homopolymers and copolymers of acrylic acid and acrylate esters. Different cross-linking densities can be produced by varying the number of vinyl units. The monomer units are typically polymerized to produce a water-soluble polymer which is rendered insoluble by cross-linking using a multivalent cation, radiation or a cross-linking agent. The cross-linked polymer or copolymer can be saponified. The cross-linking density and number of ionizable groups, such as carboxylates, determines the absorbency of the polyacrylic acid superabsorbent. The cross-linking density also affects the absorption time and the strength of the gel formed. The capacity of the superabsorbent decreases with increasing salinity.

Examples of suitable superabsorbent polymers include CABLOC® superabsorbent polymers which are commercially available from Stockhausen, Inc. of Greensboro, N.C. See "CABLOC® Superabsorbent Polymers for Power & Communication Cable Systems" a Technical Bulletin of Stockhausen, Inc. which is hereby incorporated by reference. Useful CABLOC® superabsorbent polymers which are sodium salts of crosslinked polyacrylic acid and can additionally contain a polyalcohol include CABLOC® 75, CABLOC® 80, CABLOC® 80HS, CABLOC® 80HSB, CABLOC® 85, CABLOC® 85-13 and CABLOC® C 96. Other CABLOC® materials which are useful for seawater applications are crosslinked potassium polyacrylate/polyacrylamide copolymers such as CABLOC® 40F and CABLOC® 40-13. A preferred superabsorbent polymer is CABLOC® 80HS sodium polyacrylate/polyalcohol copolymer. See "CABLOC® 80HS Superabsorbent Polymer" a Technical Bulletin of Stockhausen, Inc., which is hereby incorporated by reference. Other useful superabsorbent polymers include WATER LOCK® superabsorbent polymers, such as WATER LOCK® G-400 acrylamide/sodium acrylate copolymer which is commercially available from Grain Processing Corporation of Muscatine, Iowa. See "WATER LOCK® G-400 Series Superabsorbent Polymers", a technical bulletin of Grain Processing Corporation (Jan. 23, 1996), which is hereby incorporated by reference.

Alternatively, the hydrophilic material can be a polyacrylamide such as SEPARAN anionic polyacrylamide resin which is available from Dow Chemical Corporation.

The hydrophilic material can comprise about 50 to 100 weight percent of the secondary layer 20, and preferably comprises 100 weight percent of the secondary layer 20.

The secondary layer 20 can also comprise a hydrophobic material to inhibit water penetration along the cable. If present, the amount of hydrophobic material in the secondary layer 20 can range from about 10 to about 30 weight percent of the secondary layer 20.

The secondary layer 20 can be applied over the dried residue of the primary layer 16, but preferably is applied as an outer coating over at least a portion of the primary layer 16 while the primary layer 16 is still wet or tacky to adhere, secure or partially embed the hydrophilic material of the secondary layer 16 on the surface of the primary layer 16. The secondary layer can be applied over the primary layer by a variety of coating methods well known to those skilled in the art, but preferably is applied by passing the strand coated with the still wet primary layer through a fluidized bed or electrostatic depositor of the component(s) of the secondary layer.

The secondary layer 20 can comprise about 1 to about 10 percent of the total weight of the coated fiber strand, and preferably comprises about 1 to about 5 percent of the total weight of the coated fiber strand.

The coated strand can be incorporated as reinforcement in a telecommunications cable, for example an electrical cable or optical fiber cable 22, such as is shown in FIG. 1, comprising: (a) one or more transmission conductors such as optical fibers 24; and (b) a reinforcement strand 10 positioned about at least a portion of a periphery 26 of the optical fibers 24 for reinforcing the optical fiber cable 22.

Useful optical fibers are formed from extremely pure silica glass. Suitable optical fibers are well known to those of ordinary skill in the art and are commercially available from AT&T or Corning Glass Works of Corning, N.Y. Such fibers typically have diameters of about 125 microns and lengths of about 2 kilometers to about 20 kilometers.

In typical optical fiber cables 22, the optical fibers 24 are positioned about a generally stiff member, which can be an epoxy/glass pultruded rod or steel rod, for example. The member provides stability to the cable to inhibit contraction and expansion of the cable 22 due to environmental temperature change.

The optical fiber cable 22 can also include a protective layer 28 positioned about at least a portion of a periphery of the optical fibers 24 and reinforcement strand 10. Typically, the protective layer 28 comprises a thermoplastic material extruded as a jacket over the other components of the cable 22. Suitable thermoplastic materials include polyethylene and polyvinyl chloride. The protective layer 28 protects the cable 22 from damage from the environment.

When this protective layer 28 is breached, or at splices or joints in the optical fiber cable, water can enter the interior of the cable, possibly causing corrosion of the optical fibers. Also, freezing temperatures can cause the water to freeze and expand, thereby crushing the optical fibers. It is important that the reinforcement strand simply and economically inhibit wicking or capillary movement of water through or along the strand and inhibit contact of water with the optical fibers.

The water wicking of a coated strand can be determined by a water wicking test, such as the BellCore water wicking test or "Test Procedures for Wicking and Hygroscopicity", a technical bulletin of Superior Cable Corporation, which is hereby incorporated by reference.

The water wicking of a coated strand can be determined by the following "Water Wicking" method. An aqueous solution including a dye indicator is placed in a suitable container, such as a conventional beaker which is commercially available from Fisher Scientific. The surface area of the solution should be large enough such that the sides of the container do not unduly influence the wicking of the strand. The depth of the aqueous solution in the beaker should be about 7.6 cm (about 3 inches). Preferably, the dye is Fluorescein dye which is commercially available from Aldrich Chemical Company of Milwaukee, Wis. Other useful dyes include inks and any number of conventional dyes known to those skilled in the art. The amount of dye should be about 0.1 grams per liter of water.

Three samples of the reinforcing strand to be tested are prepared as follows. Each sample has a length of 45.7 centimeters (cm) (eighteen inches). A lead weight weighing 21 to 25 grams (¾ to ⅞ ounces) is attached to one end of each sample. The opposite end of each sample is attached to a crossbar, each sample being about 1.3 cm (about 0.5 inches) apart. A piece of filter paper is attached to each sample with a paper clip, about 7.6 cm (about 3 inches) above the lead weight. The crossbar is positioned over the dye solution such that the weighted end of each sample is immersed in the solution to position the bottom of the filter paper about 2.5 cm (about 1 inch) above the surface of the dye solution.

The wicking of the strand can be measured by measuring the distance which the dye wicks along the strand above the surface of the solution. To pass the test, the strand must wick water at a rate of less than about 25.4 millimeters (one inch) in about six hours at a temperature of about 25° C. (77° F.).

Under such test conditions, the coated strand of the present invention wicks water at a rate of less than about 25.4 millimeters (one inch) in about six hours at a temperature of about 25° C. and preferably less than about 12.7 millimeters (0.5 inches).

The present invention also provides a method of reducing the wicking of water along the surface of a strand comprising a plurality of fibers. The method comprises a first step of applying a primary layer of a coating composition comprising a hydrophobic fluorine-containing polymer discussed above to surfaces of at least a portion of a plurality of fibers. A secondary layer comprising a hydrophilic material is then applied over at least a portion of the primary layer, preferably while the primary layer is still tacky to embed the hydrophilic material in the primary layer coating. The secondarily coated strand is at least partially dried as discussed above, such that the surface of the strand has thereon the dried residue of the secondary layer which wicks water at a rate of less than about 25.4 millimeters (one inch) in about six hours at a temperature of about 25° C., as discussed above.

Another important aspect of the present invention is that the fiber strands of the present invention coated with the primary layer 16 of water repellent fluorine-containing polymers, which are polymerization reaction products of one or more fluoroalkyl acrylate monomers, vinylidene chloride, and one or more alkyl acrylates or alkyl methacrylates, are useful for reinforcing thermoplastic polymeric matrices. Non-limiting examples of suitable polymeric thermoplastic matrix materials include polyolefins, polyamides, thermoplastic polyurethanes and thermoplastic polyesters such as are discussed above, and vinyl polymers such as polyvinyl chloride and polystyrenes; and mixtures thereof. Thermoplastic elastomeric materials useful as matrix materials in the present invention include styrene-butadiene rubbers, styrene-acrylontrile (SAN) copolymers, styrene-butadiene-styrene (SBS) copolymers and acrylonitrile-butadiene-styrene (ABS) copolymers. Further examples of useful thermoplastic materials include polyimides, polyether sulfones, polyphenyl sulfones, polyetherketones, polyphenylene oxides, polyphenylene sulfides, polyacetals, polyvinyl chlorides and polycarbonates. Also included as suitable thermoplastic materials are any of the above thermoplastics which are modified by an unsaturated monomer.

Preferably the thermoplastic matrix material is a polyamide such as nylon. Suitable nylon matrix materials include nylon 6, nylon 6,6, nylon 12. The water repellent fluorine-containing polymers which are polymerization reaction products of one or more fluoroalkyl acrylate monomers, vinylidene chloride, and one or more alkyl acrylates or alkyl methacrylates provide hydrolysis resistance to the coated fibers to facilitate compatibility and bonding between the components of the coating on the fiber strands and the surrounding thermoplastic matrix materials. This hydrolysis resistance is beneficial for applications in which the composite will be exposed to water and antifreeze solutions, such as radiator caps.

Other components which can be included with the thermoplastic matrix material and reinforcing material in the composite are, for example, colorants or pigments, lubricants or process aids, ultraviolet light (UV) stabilizers, antioxidants, other fillers, and extenders.

The fiber strand reinforcing material can be dispersed in the matrix by hand or any suitable automated feed or mixing device which distributes the reinforcing material generally evenly throughout the thermoplastic matrix material. For example, the reinforcing material can be dispersed in the thermoplastic matrix material by dry blending all of the components concurrently or sequentially.

Figure 3:
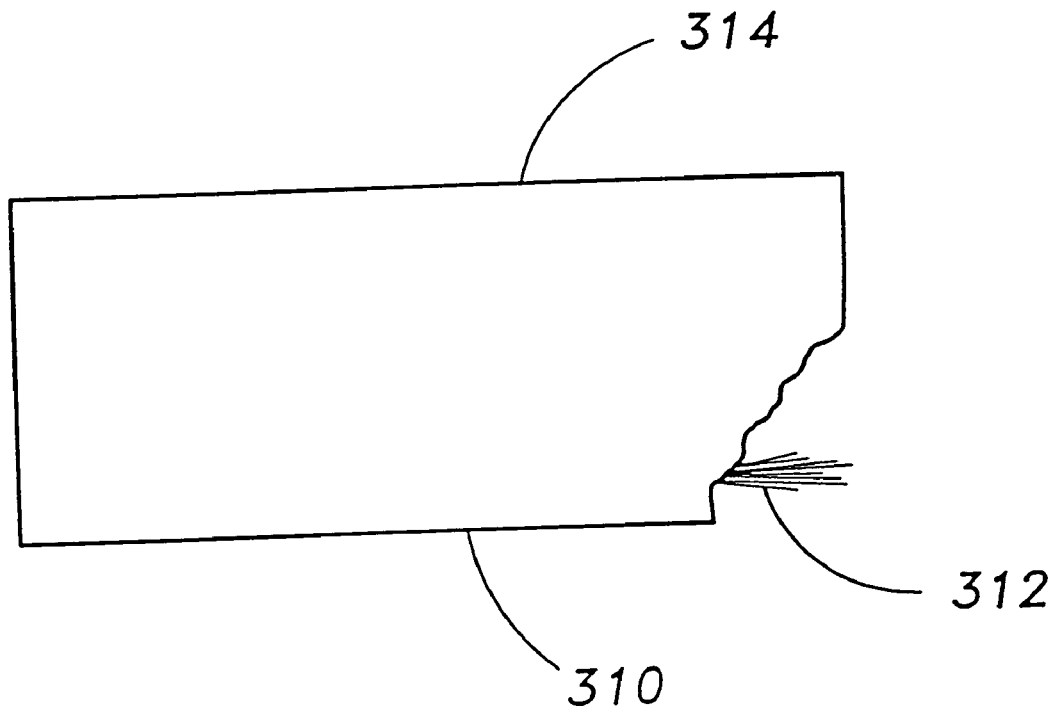
FIG. 3 is a front elevational view of a composite, partially broken away to show a coated strand according to the present invention.

The thermoplastic matrix material 310 and strand 312 can be formed into a composite 314, shown in FIG. 3, by a variety of methods which are dependent upon such factors as the type of thermoplastic matrix material used. For example, suitable methods for forming the composite include direct molding or extrusion compounding followed by injection molding. Useful extrusion equipment includes single or twin screw extruders commercially available from Werner Pfleiderer and Welding Engineers, respectively. Methods and apparatus for forming the composite by the above methods is discussed in I. Rubin, *Handbook of Plastic Materials and Technology* (1990) at pages 955–1062, 1179–1215 and 1225–1271, which are hereby incorporated by reference.

The present invention will now be illustrated by the following specific, non-limiting examples.

EXAMPLE 1

The aqueous sizing composition of Table 1 was prepared and applied to four strand bundles of H-15 E-glass fibers (1600 filaments per strand) and wound into individual forming packages in a manner similar to those discussed above. The weight of sizing composition on the fibers after drying the forming package was about 0.7 weight percent.

TABLE 1

| Component | Weight Percent of Component |
|---|---|
| PLURACOL V-10 polyoxyalkylene polyol[2] | 78 |
| EMERY 6717 partially amidated polyethylene imine lubricant[3] | 8 |
| A-1108 aminosilane[4] | 14 |

[2]PLURACOL V-10 polyoxyalkylene polyol is commercially available from BASF of Wyandotte Michigan.
[3]EMERY 6717 partially amidated polyethylene imine lubricant is commercially available Henkel Corporation of Kankakee, Illinois.
[4]A-1108 aminosilane is commercially available from OSi Specialties, Inc. of Danbury, Connecticut.

Each sample of sized glass fiber strands were coated with a primary layer of a secondary coating composition having the formulation set forth in Table 2 below.

TABLE 2

| | Weight of Component (grams) for Sample | |
|---|---|---|
| Component | Control | Test |
| RHOPLEX ® NW-1715[5] acrylic polymer | 1000 | 1000 |
| ROVENE ® 5550[6] styrene-butadiene copolymer | 100 | 100 |
| ZONYL ® 8300 fluorine-containing polymer[7] | 0 | 200 |
| PETROLITE 75 microcrystalline wax[8] | 100 | 100 |
| Deionized water | 850 | 850 |

[5]RHOPLEX NW-1715 anionic acrylic polymer emulsion is commercially available from Rohm and Haas Company of Philadelphia, Pennsylvania.
[6]ROVENE ® 5550 self-crosslinking anionic carboxylated styrene butadiene copolymer emulsion having about 45 weight percent styrene and 55 percent butadiene is commercially available from Rohm and Haas Company.
[7]ZONYL ® 8300 fluoroacrylic polymer is commercially available from Ciba-Geigy Corporation of Greensboro, North Carolina.
[8]PETROLITE 75 microcrystalline wax dispersion is commercially available from the Petrolite Corporation of Tulsa, Oklahoma.

The secondary aqueous coating compositions were applied to the sized glass fibers by drawing the glass fibers through a bath of the coating and a die to remove excess coating, such that the loss on ignition (LOI) of the coated glass strand was about 11 to about 15 percent. The diameter of the passage through the die for the four strand samples prepared was about 1.17 millimeters (0.046 inches).

A. Wicking Evaluation

Samples of each of the coated strands discussed above were evaluated for wicking of water along the strand using the Water Wicking Method discussed above. Also, a sample of AQUABLOK™ absorbent coated strand, which is commercially available from Owens-Corning of Toledo, Ohio, was evaluated using this method. The sample of AQUABLOK™ absorbent coated strand had a loss on ignition of about 15 percent.

Three 45.7 centimeters (cm) (18 inch) long samples of each strand were prepared. A lead weight weighing 21 to 25 grams (¾ to ⅞ ounces) was attached to one end of each sample. The opposite end of each sample was attached to a crossbar, each sample being about 1.3 cm (about 0.5 inches) apart. A piece of filter paper was attached to each sample with a paper clip, about 7.6 cm (about 3 inches) above the lead weight. The crossbar was positioned over a solution of 0.1 grams of Fluorescein dye per liter of water such that the weighted end of each sample was immersed in the solution to position the bottom of the filter paper about 2.5 cm (about 1 inch) above the surface of the dye solution. Each sample was kept in the dye solution for at least 6 hours at a temperature of about 25° C. (77° F.).

To pass this test, the strand must wick less than about 25.4 millimeters (one inch) in about six hours at a temperature of about 25° C. The Test Sample of the present invention passed the test, but the Control and AQUABLOK™ absorbent coated strand samples both failed the test. Accordingly, glass fiber strands coated with a composition of the present invention provide acceptable wicking resistance when evaluated using the Water Wicking Method.

B. Other Physical Properties

Five specimens of strand coated with the test secondary coating composition of Table 2 were conditioned at about 24° C. +/−2° C. (75° F. +/−5° F.) at about 55% +/−5% relative humidity for at least two hours and evaluated for tensile breaking strength (pounds-force or $lb_f$) using a drum clamp test fixture on an Instron Model No. 1125 testing machine. The chart speed was 25.4 millimeters/minute (1 inch/minute), the crosshead speed was 304.8 millimeters/minute (12 inches/minute) and the load was 453.6 kilograms (1000 lbs.).

Two five yard skein specimens of strand coated with the test secondary coating composition of Table 2 were evaluated for loss on ignition (LOI), which is the weight loss of coating on the glass strand after heating at about 650° C. (about 1200° F.).

Each specimen was weighed at a temperature of about 23° C. +/−2° C. (73.4° F. +/−3.6° F.) at a relative humidity of about 55% +/−5%. The specimens were heated in a conventional muffle furnace to a temperature of about 650° C. (about 1200° F.) for about 30 minutes, cooled to room temperature and reweighed.

The relative resistance to bending was evaluated for five test specimens of the strand coated with the test secondary coating composition using a MIT Folding Endurance Tester Model #2, which is commercially available from Tinius Olsen Testing Machine Co. of Willow Grove, Pa. Each test specimen was 15.24 centimeters (6 inches) in length. Each specimen was conditioned at about 23° C. +/−2° C. (73.4° F. +/−3.6° F.) for at least 2 hours prior to testing. A 1.52 mm (0.06 inch) jaw, 2 lb. load and spring No. 4 were used to evaluate the number of cycles to failure. See also ASTM Standard D-2176.

The results of the evaluations for average tensile breaking strength, loss on ignition (LOI) and average cycles to failure (MIT folding test), for samples of strand coated with the test secondary coating composition are set forth in Table 3.

TABLE 3

| | Sample | |
|---|---|---|
| | Control | Test |
| Average Tensile Strength (kg) | 92 | 92 |
| Average Loss on Ignition (%) | 11 | 11 |
| Average MIT Folding Flexibility (cycles to failure) | 2000 | 8000 |

The strands coated with the test secondary coating composition according to the present invention provide better resistance to bending fatigue than a control sample without the fluorine-containing polymer. As shown in Table 3, the test samples of the present invention have a greater number of average cycles to failure (MIT folding test) than that of the control sample.

C. Absorbent Coated Strands

Specimens of the Test Sample were coated with a secondary layer of a hydrophobic material, namely about 3 weight percent of CABLOC® 80HS sodium polyacrylate/polyalcohol copolymer powder which is commercially available from Stockhausen, Inc. based upon the total weight of the coated fiber. The strands were coated using a Model B-30 electrostatic dusting system which is commercially available from Electrostatic Technology, Inc. of Branford Conn. The depth of hydrophobic powder in the coater was about 2.5 cm (about 1 inch). The powder coated strands were dried at a temperature of about 260° C. (about 500° F.) for about 7 seconds.

A strand sample coated with 0.0187 grams of CABLOC® 80HS sodium polyacrylate/polyalcohol copolymer was submersed in tap water for about 10 seconds at a temperature of about 25° C. The weight of the water-swelled coating was 0.045 grams. The secondary coating therefore had absorbed about 2.5 times its weight in water. Other samples of the test strand coated with CABLOC® 80HS sodium polyacrylate/polyalcohol copolymer were tested for water wicking according to the Water Wicking Method as discussed above. These samples passed the test.

EXAMPLE 2

Several glass fiber strands, each having six strands per bundle, were sized with the sizing composition of Table 1 in Example 1 above and coated with a portion of a 50 gallon aqueous composition having about 105,000 grams of RHOPLEX® NW-1715 acrylic polymer, about 10,500 grams of ROVENE® 5550 styrene-butadiene copolymer, about 13,075 grams of ZONYL® 8300 fluoroacrylic polymer, about 300 grams of ammonium hydroxide and about 10,500 grams of PETROLITE 75 microcrystalline wax dispersion in a similar manner to that discussed in Example 1 above. The solids of the coating were about 28 percent by weight and the pH was about 8.3. The secondary aqueous coating composition was applied to the sized glass fibers by drawing the glass fibers through a bath of the coating and a die to remove excess coating, such that the loss on ignition (LOI) of the coated glass strand was about 11 to about 14 percent. The diameter of the passage through the die for the four strand samples prepared was about 1.4 millimeters (0.056 inches).

Samples of the coated strands were tested according to the Water Wicking Method discussed above. The absorbent coated strand samples passed the test.

From the foregoing description, it can be seen that the present invention provides a simple, economical optical fiber cable in which the reinforcement strand resists water wicking and is capable of withstanding the rigorous environment to which such reinforcement is subjected. In another preferred embodiment, coated fiber strands of the present invention inhibit hydrolysis in thermoplastic composites.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A strand comprising a plurality of fibers having on at least a portion of surfaces thereof:
   (a) a primary layer of a coating composition comprising a hydrophobic fluorine-containing polymer; and
   (b) a secondary layer comprising a hydrophilic material applied over at least a portion of the primary layer.

2. The strand according to claim 1, wherein the fibers are formed from fibrous materials selected from the group consisting of inorganic materials, thermoplastic materials, natural materials and combinations thereof.

3. The strand according to claim 2, wherein the fibers are formed from an inorganic material which is glass.

4. The fiber strand according to claim 1, wherein the fluorine-containing polymer is present as a solid.

5. The fiber strand according to claim 1, wherein the fluorine-containing polymer is a polymerization reaction product of a fluoroalkyl acrylate monomer component, vinylidene chloride and an alkyl acrylate monomer component.

6. The fiber strand according to claim 5, wherein the fluoroalkyl acrylate monomer component is a perfluoroalkylethylacrylate monomer.

7. The fiber strand according to claim 5, wherein the fluoroalkyl acrylate monomer component is a mixture of perfluoroalkylethylacrylate monomers.

8. The fiber strand according to claim 5, wherein the alkyl acrylate monomer component is a mixture of alkyl acrylate monomers.

9. The fiber strand according to claim 1, wherein the hydrophilic material is selected from the group consisting of cellulosics, starch-graft copolymers, synthetic superabsorbent materials and mixtures thereof.

10. The fiber strand according to claim 9, wherein the hydrophilic material is a synthetic superabsorbent material which comprises a copolymer of sodium polyacrylate and polyalcohol.

11. A glass fiber strand having on at least a portion of surfaces thereof:
   (a) a primary layer of a coating composition comprising a hydrophobic fluorine-containing polymer; and
   (b) a secondary layer comprising a hydrophilic material applied over at least a portion of the primary layer.

12. A strand comprising a plurality of fibers having on at least a portion of surfaces thereof:
   (a) a primary layer of a coating composition comprising a hydrophobic polymerization reaction product of a fluoroalkyl acrylate monomer component, vinylidene chloride and an alkyl acrylate monomer component; and
   (b) a secondary layer comprising a hydrophilic material applied over at least a portion of the primary layer.

13. The strand according to claim 12, wherein the fibers are formed from fibrous materials selected from the group consisting of inorganic materials, thermoplastic materials, natural materials and combinations thereof.

14. The strand according to claim 13, wherein the fibers are formed from an inorganic material which is glass.

15. The fiber strand according to claim 12, wherein the fluorine-containing polymer is present as a solid.

16. The fiber strand according to claim 12, wherein the fluoroalkyl acrylate monomer component is a perfluoroalkylethylacrylate monomer.

17. The fiber strand according to claim 12, wherein the fluoroalkyl acrylate monomer component is a mixture of perfluoroalkylethylacrylate monomers.

18. The fiber strand according to claim 12, wherein the alkyl acrylate monomer component is a mixture of alkyl acrylate monomers.

19. The fiber strand according to claim 12, wherein the hydrophilic material is selected from the group consisting of cellulosics, starch-graft copolymers, synthetic superabsorbent materials and mixtures thereof.

20. The fiber strand according to claim 19, wherein the hydrophilic material is a synthetic superabsorbent material which comprises a copolymer of sodium polyacrylate and polyalcohol.

21. A glass fiber strand having on at least a portion of surfaces thereof:
   (a) a primary layer of a coating composition comprising a hydrophobic polymerization reaction product of a fluoroalkyl acrylate monomer component, vinylidene chloride and an alkyl acrylate monomer component; and
   (b) a secondary layer comprising a hydrophilic material applied over at least a portion of the primary layer.

* * * * *